July 31, 1962 H. HORGEN 3,046,727
POWER PLANTS INCLUDING AT LEAST ONE FREE PISTON
AUTO-GENERATOR AND AT LEAST ONE GAS TURBINE
FED WITH POWER GAS FROM SAID GENERATOR
Filed June 29, 1959 3 Sheets-Sheet 1
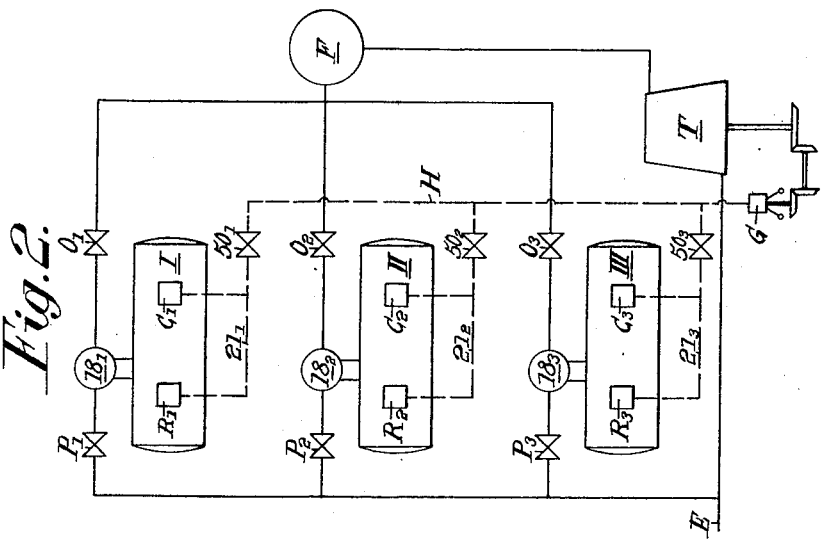
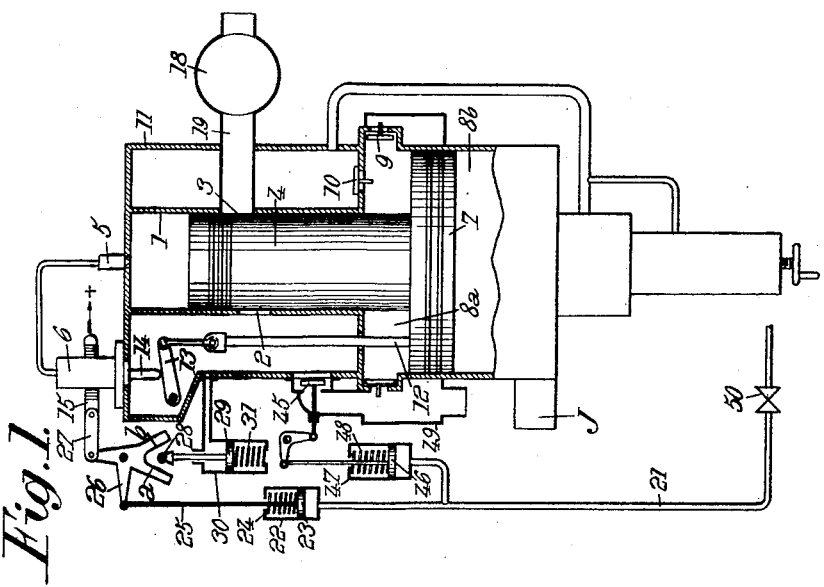
INVENTOR
HELGE HORGEN
BY
ATTORNEYS

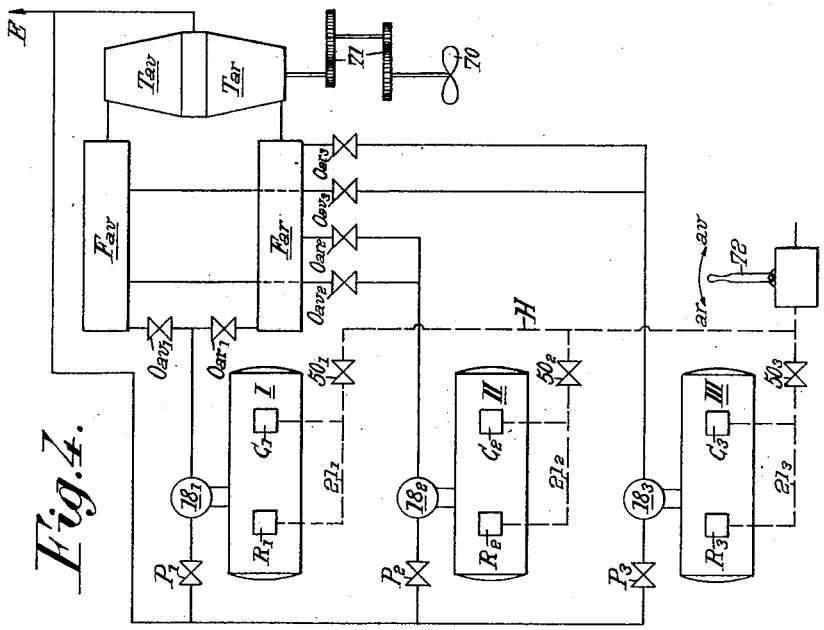

United States Patent Office 3,046,727
Patented July 31, 1962

3,046,727
POWER PLANTS INCLUDING AT LEAST ONE FREE PISTON AUTO-GENERATOR AND AT LEAST ONE GAS TURBINE FED WITH POWER GAS FROM SAID GENERATOR
Helge Horgen, Lyons, France, assignor to Societe d'Etudes et de Participations Eau, Gaz, Electricite, Energie S.A., Geneva, Switzerland, a Swiss company
Filed June 29, 1959, Ser. No. 823,553
Claims priority, application France July 18, 1958
13 Claims. (Cl. 60—13)

The present invention relates to power plants including at least one free piston auto-generator and at least one gas turbine fed with power gas from said auto-generator. The invention is more especially, but not exclusively, concerned with power plants including a plurality of such auto-generators capable of being individually brought into or out of operation, the outputs of all of said auto-generators leading to a common reservoir inserted between said auto-generators and said turbine.

The object of my invention is to provide a power plant of this kind which is better adapted than those existing at the present time to comply with the requirements of practice.

For this purpose, according to my invention, the auto-generator is of the type in which, for loads of the turbine below a given minimum value, only part of the compressed air available in the compressor portion of the generator is delivered to the power cylinder of said generator, the remainder of this compressed air being delivered to the outside, and I provide, in the output conduit means for conveying power gases from said generator to said turbine and in discharge conduit means for conveying power gases from said generator to the outside (i.e. to a space where the pressure is at least approximately equal to atmospheric pressure), respectively two valve means each capable of occupying only either a wholly opened position or a wholly closed position, so that one of said valve means either opens or closes the communication between the generator and the turbine and the other valve means either opens or closes the communication between the generator and the outside. Advantageously said valve means are controlled in response to variations of the pressures which exist, on the one hand, upstream of said valve means and, on the other hand, at the inlet of the turbine or, in the case of a plurality of generators, in the common reservoir provided between said generators and said turbine.

According to a preferred embodiment of my invention, said valve means are operated by control means arranged so that, as long as the corresponding generator is working, automatically one of said valve means is open and the other is closed whereas, when the generator is stopped, both of said valve means are closed. Preferably in this case, the above mentioned discharge conduit means open into the exhaust pipe of the turbine or into an exhaust manifold common to all the generators.

Other features of my invention will become apparent in the following detailed description of some embodiments thereof, with reference to the appended drawings, given merely by way of example and in which:

FIG. 1 is a diagrammatic section view of a free piston auto-generator for use in a power plant according to the invention.

FIG. 2 shows, also diagrammatically, a power plant including a turbine and several auto-generators, this power plant being made according to the invention and being intended for instance to supply power for an electric power station.

FIG. 3 shows on an enlarged scale the conduits connecting one of the auto-generators of FIG. 2 with a common gas reservoir located upstream of the turbine.

Figure 5:
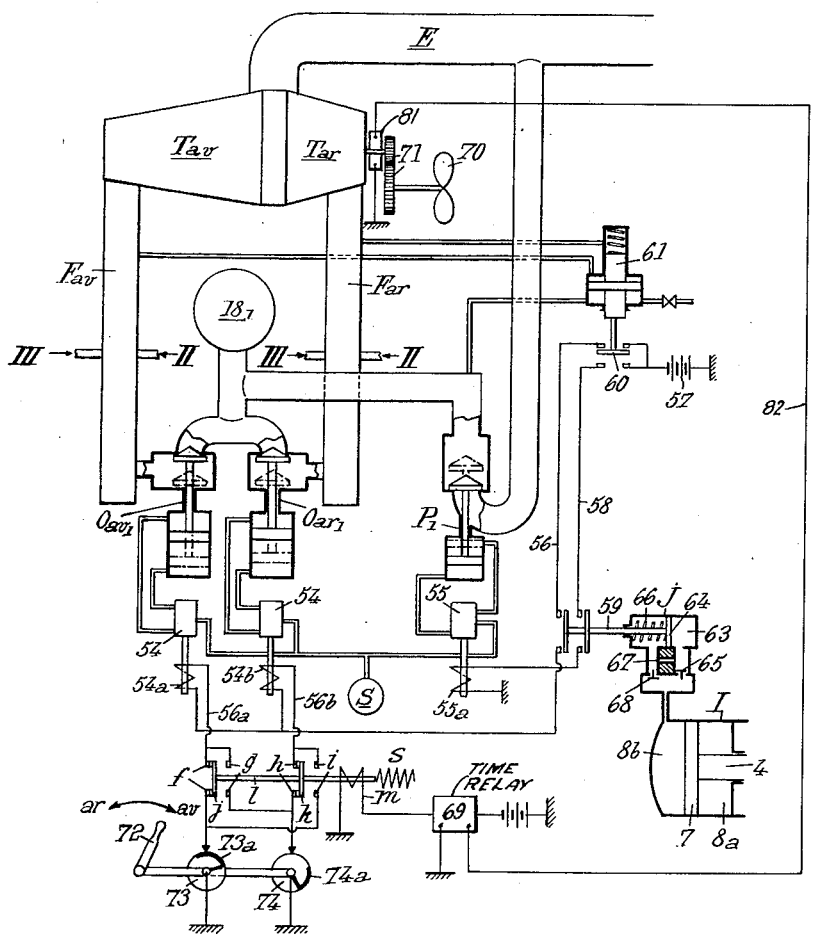

FIG. 4 diagrammatically shows a power plant for a ship including several auto-generators, a forward turbine and a rearward turbine.

FIG. 5 shows on an enlarged scale the connection of the auto-generators of the power plant of FIG. 4 with the turbines.

I will first describe a free piston auto-generator for use in a power plant according to the invention, this auto-generator being supposed, for the sake of simplicity, to include a single free piston unit whereas, for practical purposes, such an auto-generator generally includes two free piston units working in opposed directions.

The auto-generator of FIG. 1 comprises a power portion working on a two stroke cycle and in particular a diesel cycle, this power portion including a power cylinder 1 provided with inlet ports 2 and outlet ports 3. In this cylinder is slidably mounted a power piston 4. This power piston 4 opens, when it is in the vicinity of its outer dead center position, the inlet port 2 and exhaust port 3. Furthermore in the end face of power cylinder 1 there is mounted a fuel injector 5 fed from an injection pump 6.

The free piston unit of the machine includes, in addition to power piston 4, a compressor piston 7 slidably mounted in a compressor cylinder 8 divided by said piston into two chambers. The inner chamber $8_a$ constitutes the compressor space proper and is provided with intake valves 9 through which the air to be compressed is sucked in from the surrounding atmosphere, and with delivery valves 10 mounted in a wall which separates said chamber $8_a$ from a casing 11 which surrounds power cylinder 1 and into which the air compressed by piston 7 is delivered so as to constitute the feed and scavenging air for cylinder 1.

The other chamber $8_b$ of cylinder 8 contains an air cushion which stores up the energy of piston 4 when said piston is moving outwardly under the effect of fuel combustion in power cylinder 1 and which gives back this energy to free pistons 4 and 7 during the inward stroke of said piston, when air is compressed in chamber $8_a$. Delivery of this air into casing 11 and compression of the combustion air contained in power cylinder 1 after piston 4 has closed ports 2 and 3 also take place under the effect of the energy stored up in the air cushion formed in chamber $8_b$.

Injection pump 6 is driven by a rod 12 rigid with compressor piston 7 and which imparts a reciprocating movement to a lever 13 acting through push piece 14 on the piston of pump 6. Adjustment of the amount of fuel injected by pump 6 through injector 5 into power cylinder 1 every time piston 4 is in the vicinity of its inner dead center position is controlled by a rod 15 movable in its longitudinal direction and producing for instance a rotation of the piston of pump 6 about its axis. The more this rod 15 is moved toward the right (arrow +) the greater the amount of fuel injected on every stroke of the piston and vice versa.

The displacements of rod 15 are advantageously obtained by means of the pressure of a liquid fed through the conduit 21, the value of this pressure being determined either by a control member actuated either manually by the person supervising the power plant or automatically by a governor driven by a turbine of said plant.

Conduit 21 opens into a cylinder 22 in which is slidably mounted a piston 23 subjected to the action of a return spring 24. The rod 25 of piston 23 is pivotally connected to one of the arms of a bent lever 26 the other arm of which is connected through a link 27 to said regulating rod 15. In order to keep the rate of fuel feed within a given range corresponding to the constructional features of the auto-generator, bent lever 26 is integral or rigid with a double cam somewhat in the form of an inverted V, which cooperates with an abutment 28 the position of which varies as a function of the pressure existing in casing 11. For this purpose, abutment 28 is carried by a piston 29 slidable in a cylinder 30 and on one of the faces of which the above mentioned pressure acts whereas the other face of the piston is subjected to the action of a return spring 31. When the portion $a$ of the double cam cooperates with abutment 28, the amount of fuel injected by the pump is kept at a minimum value whereas when it is the portion $b$ of said cam that cooperates with abutment 28, the amount of fuel that is injected is kept at a maximum value.

When the receiver turbine works under loads ranging from an average load to the maximum possible load, adjustment of the power plant takes place exclusively under the effect of the displacements of regulating rod 15. But when the auto-generator is working under no load or under a very low load that is to say for a range of loads such that the outward pressure of the auto-generator ranges for instance from 0.5 to 1.5 effective atmospheres. Within this range there is an excess of compressed air. This excess of air may be recycled and mixed with fresh air about to enter chamber $8_a$ so that this air undergoes a re-heating which permits of reducing the final compression pressure in the power cylinder, as already described in my patent application S.N. 520,279, filed on July 6, 1955, now Patent No. 2,960,818, issued November 22, 1960 for "Improvements in gas generators of the internal combustion operated free piston type." In order to obtain this recycling of compressed air, there is mounted on casing 11 an outlet valve 45 controlled by a piston 46 slidable in a cylinder 47 and one of the faces of which is subjected to the pressure existing in conduit 21, whereas the other surface is placed under the action of an opposing spring 48. The strength of this spring is chosen in such manner that valve 45 is open as long as the pressure in conduit 21 is below a given value corresponding to a given load, for instance to that for which the working pressure of the auto-generator is equal to 1.5 atmospheres, this valve being the more opened as the pressure in conduit 21 is lower, whereas above said given value of the load, valve 45 remains closed. The hot air which is allowed to escape through valve 45, when said valve is opened, mixes, in a casing 49 which surrounds the inlet valve 9 of chamber $8_a$ of the compressor cylinder, with air which during the suction stroke of piston 7 enters said chamber $8_a$ so that this air is the more re-heated as the load of the turbine is lower.

The exhaust valve 3 of power cylinder 1 is connected to the intake of turbine T, to be driven by the power gases from the auto-generator, through a conduit 19 and a reservoir or muffler 18 inserted in said conduit.

Up to now, it was usual to provide, in the conduit connecting the auto-generator or every auto-generator with the intake of the turbine, a double-seat valve which, in one of its end positions, connected the auto-generator wholly with the turbine and closed an exhaust conduit opening into the atmosphere, whereas, in its other end position, said valve wholly closed the conduit leading to the turbine and wholly opened said discharge conduit. For intermediate positions, the valve opened both the conduit leading to the turbine and the discharge conduit so as to feed a portion of the power gases to the turbine and to allow the remainder of said gases to escape into the atmosphere.

One of the purposes of the present invention is to avoid this gradual control double-seat valve. According to the present invention, I provide, in the output conduit leading from the exhaust port 3 of the generator to the turbine and in a discharge conduit leading from said exhaust port to a space at a pressure substantially equal to atmospheric pressure, respectively, two valve means each capable of occupying only either a wholly open position or a wholly closed position so that one of said valve means either opens or closes the communication between the exhaust port of the generator and the turbine and the other valve means either opens or closes the communication between the exhaust port of the generator and a space at a pressure substantially equal to atmospheric pressure. When both of these valve means are closed, the auto-generator is wholly separated from the turbine. When the valve means which controls the discharge of gases is opened and the other valve means is closed, it is possible, during the starting period of the auto-generator, to cause the output pressure of said generator to increase gradually until it has reached the value corresponding to that existing at the intake of the turbine supposed to be fed at this time from other auto-generators. When the valve means which controls the discharge of gases to the atmosphere is closed and the other valve means is opened, it is possible to connect the auto-generator with the turbine to be fed with power gases.

FIG. 2 diagrammatically shows a power plant according to my invention including a gas turbine T for driving an electric current generator and three gas generators I, II and III for feeding power gases to said turbine T. Each of these gas generators is for instance of the same general construction as that illustrated by FIG. 1.

Taking for instance gas generator I, I have diagrammatically shown on FIG. 2, at $C_1$ its fuel feed regulating device and at $R_1$ its air recycling device. The fuel regulating device $C_1$ includes pump 6, regulating rod 15 and means for controlling said rod, as shown by FIG. 1. The air recycling device $R_1$ includes valve 45, casing 49 and the means for controlling said valve 45. I have also shown on FIG. 2 the muffler $18_1$ of gas generator I, the conduit $21_1$ of liquid under varying pressure for controlling devices $C_1$ and $R_1$ and the valve $50_1$ for connecting this conduit $21_1$ with a conduit H, common to the three gas generators I, II and III, for supplying said liquid under a pressure determined by a speed governor G mounted on the shaft of turbine T.

Corresponding elements of generators II and III are designated by the same reference characters as for generator I, but with digits 2 and 3, respectively, instead of 1 ($R_2$ and $C_2$ instead of $R_1$ and $C_1$, respectively, and so on). It will therefore suffice to describe the arrangement for one gas generator (generator I), since it is the same for the other generators (with corresponding reference characters).

According to my invention, as illustrated by the construction of FIG. 2, in the output conduit extending between muffler $18_1$ and reservoir F (common to the three gas generators and in communication with the intake of turbine T) there is provided a two position valve $O_1$, and in the discharge conduit extending from muffler $18_1$ to the atmosphere (this discharge conduit having a portion thereof in common with a portion E of the exhaust conduit of turbine T) there is provided a two position valve $P_1$.

In the embodiment of my invention illustrated by FIG. 2, devices $C_1$ and $R_1$ are controlled by the variations of the pressure in conduit $21_1$ adapted to be connected with conduit H in which the fluid (liquid) present therein is at a pressure determined by governor G, mounted on the shaft of turbine T. Governor G controls the pressure in conduit H so as to increase this pressure when the speed of turbine T decreases, and vice versa. Valve $50_1$, inserted between conduit $21_1$ and conduit H makes it possible either to cut off the communication between said conduits (so that here is practically no fluid pressure in conduit $21_1$) or gradually to open this communication so as to obtain a gradual rise of the fluid pressure in conduit $21_1$.

Valves $O_1$ and $P_1$ are preferably controlled in accordance with the respective pressures existing on the one hand upstream of said valves (i.e. in muffler $18_1$) and on the other hand in the portion of the output conduit extending between valve $O_1$ and the intake of turbine T (for instance in common reservoir F).

A preferred embodiment of means for controlling valves $O_1$ and $P_1$ is shown by FIG. 3. In this construction valves $O_1$ and $P_1$ are operated by a power fluid consisting of compressed air supplied from a source S. The feed of this compressed air to cylinders 52 and 53, in which are slidably mounted pistons rigid with valves $O_1$ and $P_1$, is controlled by electrically controlled valves 54 and 55.

As long as the windings $54_a$ and $55_a$ of electro-valves 54 and 55 are not fed with electric current, valves $O_1$ and $P_1$ are in the closed positions shown in solid lines by FIG. 3, where they cut off fluid circulation through the conduits in which they are inserted. When current is fed to their windings they open (positions in dotted lines). The opening movement of valve $O_1$ is in the same dierction as that in which the power gases from muffler $18_1$ flow toward turbine T. On the contrary the opening movement of valve $P_1$ takes place in a direction opposed to the direction of flow of the gases discharged from muffler $18_1$ toward a reservoir D (common to the three gas generators) and thence toward the atmosphere.

The winding $54_a$ of electro-valve 54 may be connected, through a conductor 56, with a battery 57, and the winding $55_a$ of electro-valve 55 may be connected, through a conductor 58, to this battery 57. Both of the conductors may be interrupted simultaneously by a double switch 59 which automatically opens when auto-generator I is stopped and which automatically closes when auto-generator I is working. The means for controlling this switch 59 will be hereinafter described. Furthermore a switch 60 connects one of the conductors 56 and 58 with battery 57 while it cuts off the other therefrom, and vice versa.

This switch 60 is controlled by the differential action of the pressure existing respectively in muffler $18_1$ and in reservoir F (common to all the gas generators I, II and III). These pressures act on the opposed faces, respectively, of a piston 61 operatively connected with switch 60. This piston 61 is further subjected to the action of a spring 62 acting on piston 61 in the same direction as the pressure existing in muffler $18_1$.

Operation of the device shown by FIG. 3 is as follows:

As long as gas generator I is stopped, the corresponding double switch 59 cuts off current circulation through (that is to say opens) conductors 56 and 58, and valves $O_1$ and $P_1$ are closed. As soon as the gas generator is started the circuits through both of conductors 56 and 58 are closed by switch 59. If, at this time, there is a high pressure in reservoir F, due to the fact that the other generators (II and III) have already been working, switch 60 is in its lower position, where it connects conductor 58 with battery 57. Consequently, in response to the starting of generator I, valve $P_1$ is opened, opening the discharge conduit means, i.e. placing muffler $18_1$ in communication with exhaust conduit E, whereas valve $O_1$ remains closed. If the resistance to the flow of gases through the discharge conduit means (in particular produced by valve $P_1$ and the conduit in which it is inserted) is suitably determined, being for instance approximately equal to the resistance opposed to the flow of gases by turbine T, the output pressure of generator I gradually rises. There comes a time when this pressure, which is that existing in muffler $18_1$, becomes sufficient to shift switch 60 into its upper position, thus cutting off the connection between conductor 58 and battery 57 and connecting conductor 56 with this battery 57. Valve $P_1$ is then closed whereas valve $O_1$ is opened and generator I starts feeding power gases to reservoir F and thence to turbine T.

If auto-generator I is subsequently stopped, double switch 59 is shifted into opening position so that valve $O_1$ is stopped, valve $P_1$ remaining in closed position.

In what precedes it has been supposed that when auto-generator I is started there is a relatively high pressure in reservoir F (produced by the operation of the other generators). But if there is no pressure in reservoir F (due to generator I being the first to be started) switch 60 is, when generator I is started, in its upper position owing to the action of spring 62, so that conductor 56 is connected to battery 57 whereas conductor 58 is cut off therefrom. Consequently valve $O_1$ is opened whereas valve $P_1$ is closed. Auto-generator I, as soon as it is started, delivers power gases toward turbine T.

It is the strength of spring 62 that determines the minimum value of the pressure in reservoir F necessary to cause the opening of valve P1 when the auto-generator is started, the power gases from said generator being then sent through the discharge conduit to reservoir D and the atmosphere. If the pressure in reservoir F is lower than said minimum value, $P_1$ remains closed and $O_1$ is opened when the generator is started, and the power gases from said generator are sent to turbine T.

Every time one generator (for instance generator I) is started while other generators of the same power plant are already in operation and are feeding power gases to the turbine common to all of them, control of the generator that is being started to cause its output pressure to rise gradually up to the pressure prevailing in the common reservoir F is performed by gradually opening the valve $50_1$ of said generator so that the control pressure in conduit H acts only gradually upon the devices C and R of said generator.

If, when an auto-generator (for instance I) is started with its valve $P_1$ opened (so that its muffler $18_1$ is connected with exhaust conduit E), the pressure drop along the discharge conduit thus provided proves to be insufficient, I may provide, in this discharge conduit, silencers of high efficiency to increase said pressure drop, or possibly throttling means for the same purpose arranged to be more and more closed as the pressure in conduit $21_1$ is rising due to the gradual opening of valve $50_1$.

In the embodiment of my invention shown by the drawing, the device J for controlling double switch 59 (so as to keep it closed as long as the gas generator is working and to open it when said generator is stopped for any reason whatever) is made as follows:

This device J is mounted on chamber $8_b$ of the auto-generator compressor cylinder. It includes a cylinder 63 in which is slidably mounted a piston 64 rigid with the movable rod of switch 59. The variable pressure existing in chamber $8_b$ is transmitted, past two opposed check valves 65 and 68, to the portions of cylinder 63 located on opposite sides of piston 64 so that the maximum pressure in chamber $8_b$ is transmitted to the portion of cylinder 63 on the right of piston 64 whereas the minimum pressure in chamber $8_b$ is transmitted to the portion of cylinder $8_b$ on the left of piston 64. This pressure difference, urging piston 64 toward the left, is capable of overcoming the resistance of spring 66, and thus to keep switch 59 in the circuit closing position, as long as the auto-generator is working.

A throttled passage 67 extends between the two portions of cylinder 63 located on opposite sides of piston 64 so that, when the generator stops working, the pressures in said portions of cylinder 63 soon become equal to each other and spring 66 returns switch 59 into circuit opening position.

According to my invention, I further provide a reversing switch $f-g-h-i-j-k-l-m$ capable, in case of sudden and important drop of the load of turbine T (for instance when it ceases to supply electric power through the current generator), of disconnecting the gas generator from the turbine by closing valve $O_1$ while simultaneously opening valve $P_1$ so that the power gases from the gas generator flow out through the discharge conduit to the atmosphere. In this way the turbine is prevented from racing and the power plant is stopped without the regulation system of the auto-generator being brought into play.

This reversing switch includes four pairs of cooperating contacts $f$, $g$, $h$ and $i$, adapted to cooperate with two bars $j$ and $k$ carried by a rod $l$ actuated by a winding $m$. For one position of rod $l$, when winding $m$ is not energized, bar $j$ connects contacts $f$ together and bar $k$ connects contacts $h$ together so that winding $54_a$ is connected with conductor $56$ and winding $55_a$ with conductor $58$ (as shown by FIG. 3). Centrifugally operated contactor $81$, mounted on the shaft of turbine T, closes the input circuit $82$ of time relay $69$ when, due to a sudden drop of the load on turbine T, the speed of said shaft exceeds a given value. Time relay $69$, when thus energized, causes current to flow through coil $m$ to pull rod $l$ toward the right.

In case of a sudden drop of the load of turbine T, due to the fact that it ceases to supply electric power through the current generator driven by said turbine, this change in the operation of the current generator causes the temporary closing of a time relay $69$. The feed of current through winding $m$ shifts rod $l$ into the position where it now connects contacts $g$ together through bar $j$ and contacts $i$ together through bar $k$. The connections between windings $54_a$ and $55_a$ on the one hand and conductors $56$ and $58$ on the other hand are then reversed, thus causing valve $O_1$ to be closed and valve $P_1$ to be opened. Racing of turbine T is thus avoided since it ceases to be fed with power gases from the gas generator, said gases being now sent through the discharge conduit means to the atmosphere. After a predetermined time, relay $69$ again opens automatically and the reversing switch is returned to its initial position, but at this time there is no longer any danger of racing of the turbine and the closing of valve $P_1$ and reopening of valve $O_1$ merely serve to permit the running under no load of the auto-generator.

FIGS. 4 and 5 illustrate the application of the present invention to a power plant for the propulsion of a ship, such a power plant including a forward drive turbine $T_{av}$ and a backward drive turbine $T_{ar}$, these turbines having a common shaft which is coupled with the screw propeller $70$ of the ship through a speed reducing gear $71$.

According to my invention, the exhaust or muffler of every gas generator (for instance generator I) of the power plant can be connected, on the one hand, through a two-position valve $O_{av_1}$ to the intake chamber $F_{av}$ of the forward drive turbine $T_{av}$ and through a two-position valve $O_{ar_1}$ to the intake chamber $F_{ar}$ of the backward drive turbine $T_{ar}$, and on the other hand through a two-position valve $P_1$ to a discharge conduit which may, as in the construction of FIG. 2, have a portion in common with the exhaust conduit of turbines $T_{av}$ and $T_{ar}$.

In such a power plant it is advantageous to place the elements such as $O_{av_1}$ and $O_{ar_1}$ of the corresponding auto-generator I as close as possible to the turbines.

Furthermore, the whole of the forward drive valves of the generators and the whole of the backward drive valves of the generators should be disposed so that a common manual control thereof is possible in case of necessity.

In the power plant shown by FIG. 4, the regulation pressure prevailing in conduit H is controlled by the operator through a hand lever $72$. The control device is arranged in such manner that, when lever $72$ is in vertical position (middle position) the regulation pressure in conduit H has its minimum value, for which the amount of fuel that is injected is minimum, and recycling valve $45$ is open. When lever $72$ is rotated toward the right or toward the left, the regulation pressure in conduit H is increased which moves the fuel adjustment member of every generator controlled through conduit H in the direction corresponding to an increase of the amount of fuel that is injected and closes the recycling valve $45$ when the pressure in conduit H exceeds a given value.

Furthermore lever $72$ simultaneously controls, for every generator (for instance generator I) a pair of switches $73$ and $74$ (FIG. 5) inserted in two branches $56_a$ and $56_b$ of conductor $56$.

On FIG. 5, which shows on an enlarged scale the connections between auto-generator I and turbines $T_{av}$ and $T_{ar}$, the parts corresponding to similar parts shown by FIG. 3 are designated by the same reference characters.

In the branches $56_a$ and $56_b$ of conductor $56$ are provided windings $54_a$ and $54_b$ respectively, one of which, $54_a$, controls valve $O_{av_1}$ and the other, $54_b$, valve $O_{ar_1}$, these valves being inserted between muffler $18_1$ and the respective turbines $T_{av}$ and $T_{ar}$. Furthermore, the respective contact parts $73_a$ and $74_a$ of switches $73$ and $74$ are arranged in such manner that, when hand lever $72$ is in its vertical (middle) position, said contact parts $73_a$ and $74_a$ simultaneously close the two conductor branches $56_a$ and $56_b$. Consequently, if conductor $56$ is closed simultaneously by switch $60$ and double switch $59$, both of the valves $O_{av_1}$ and $O_{ar_1}$ are opened and the respective torques of turbines $T_{av}$ and $T_{ar}$ balance each other on the common shaft of said turbines so that it is possible to keep the autogenerators running on no load, even when the ship is stopped.

If hand lever $72$ is rotated in the clockwise direction, switch $74_a$ is opened and branch $56_b$ placed out of circuit so that current ceases to flow through winding $54_b$ and valve $O_{ar_1}$ is closed, stopping the feed of power gases to the backward drive turbine $T_{ar}$. Only the forward drive turbine $T_{av}$ is running. The reverse is obtained, in a likewise manner, when hand lever $72$ is moved toward the left from the vertical position, thus producing backward running.

If the gas generator is stopped, double switch $59$ opens both of the conductors $56$ and $58$ and the three valves $O_{av_1}$ and $O_{ar_1}$ and $P_1$ are closed (FIG. 5).

When it is desired to cause a gas generator (for instance I) which has been kept at rest up to then to deliver power gases to one of the reservoirs $F_{av}$ and $F_{ar}$ of turbines $T_{av}$ and $T_{ar}$ respectively, said reservoirs being already fed with power gases from other generators (II and III) in operation, it suffices to start this generator I and gradually to open the valve $50_1$ thereof. As soon as the generator is started, its double switch $59$ closes. Due to the pressure existing already in reservoir $F_{av}$ or $F_{ar}$, the switch $60$ of this generator I is brought into the position where it closes conductor $58$ and opens discharge valve $P_1$.

It should be noted that, in the construction illustrated by FIG. 5 piston $61$ is a stepped piston on which the respective pressure prevailing in reservoirs $F_{av}$ and $F_{ar}$ act simultaneously and both in the same direction. As soon as the pressure in the muffler of the recently started generator I has reached a pressure corresponding to that existing in reservoirs $F_{av}$ or $F_{ar}$, switch $60$ is moved upwardly, opening conductor $58$ and closing conductor $56$. Valve $P_1$ closes and one of the valves $O_{av_1}$ and $O_{ar_1}$ (the one having its conductor branch $56_a$ or $56_b$ closed at this time as a consequence of the position of hand lever $72$) is opened, connecting the output of the recently started generator with the feed reservoir, $F_{av}$ or $F_{ar}$, of the turbine, $T_{av}$ or $T_{ar}$, in operation.

If, for some reason, the speed of the turbine ($T_{av}$ or $T_{ar}$) in operation exceeds a maximum admissible value (for instance because screw propeller $70$ has emerged from water), reversing switch $f$–$g$–$h$–$i$–$j$–$k$–$l$–$m$ is brought into play by a speed governor (not shown) mounted on the driving gear of screw propeller $70$ and which sends current into the winding $m$ of said reversing switch. This sends the power gases delivered by the generator from the turbine having a tendency to race to the other turbine, thus immediately slowing down the rotation of the turbines and of the screw propeller.

It is pointed out that in the power plant shown by FIG. 5 the reversing switch does not act upon the discharge valve P as in the construction of FIG. 3 but exclusively on the forward and backward control valves $O_{av}$ and $O_{ar}$. As soon as the speed of the turbine shaft has again become normal, current ceases to be fed to winding $m$ and the reversing switch returns the parts into their initial positions.

The present invention has the following advantages.

Any continuous regulation device acting on hot gases under pressure is eliminated, all the continuous regulation devices that are provided acting on the air flowing through the auto-generators. Furthermore any generator can be separated from the gas circuit without making use of special non-return valves between the generator and the gas circuit. In particular it has become possible to discharge the gases that are by-passed from the turbine gas feed circuit into the gas exhaust conduit of the turbine or into a common exhaust chamber, thus dispensing with the necessity of providing individual by-pass conduits opening into the atmosphere. Separation of every generator from the common turbine gas feed circuit, in case of stopping of said generator, is instantaneous.

The two position valves may be controlled by means of compressed air, which has the advantage of a quick action and of small dimensions for the conduits, the compressibility of air having no disadvantageous effect on regulation.

As above explained, a recently started generator has its output automatically connected with the common feed reservoir of power gases as soon as its output pressure becomes sufficient. Whenever possible a generator is connected immediately on being started with said common feed reservoir if the pressure therein is not too high.

Finally the use of a reversing switch as above described automatically limits the turbine speed in case of danger of racing thereof.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A power plant which comprises, in combination, a gas turbine having a gas intake, an intake conduit leading to said gas intake, a free piston auto-generator including a power portion having a power cylinder and a power piston reciprocable in said power cylinder, an air compressor portion having a compressor cylinder rigid with said power cylinder and a compressor piston reciprocable in said compressor cylinder and rigid with said power piston, said pistons being freely movable with respect to their respective cylinders, said power portion further including a casing to receive compressed air from said compressor portion to feed it to said power cylinder, means for feeding compressed air from said compressor portion to said casing, means for feeding fuel to said power cylinder, means responsive to variations of the load of said turbine for discharging some compressed air from said casing away from said power cylinder for values of said load lower than a given minimum, output conduit means extending between said power cylinder and said intake conduit, discharge conduit means extending between said power cylinder and the atmosphere, first valve means in said output conduit means capable of occupying only two positions, to wit a wholly opened position and a wholly closed position, second valve means in said discharge conduit means capable of occupying only two positions, to wit a wholly opened position and a wholly closed position, control means for operating said first and second valve means to open one while closing the other, and temporary reversing means operative in response to a sudden increase of the speed of said turbine beyond a given value to reverse for a predetermined time the positions of said first and second valve means respectively.

2. A power plant which comprises, in combination, a gas turbine having a gas intake, an intake conduit leading to said gas intake, and at least two free piston auto-generators, each of said auto-generators including a power portion having a power cylinder and a power piston reciprocable in said power cylinder, an air compressor portion having a compressor cylinder rigid with said power cylinder and a compressor piston reciprocable in said compressor cylinder and rigid with said power piston, said pistons being freely movable with respect to their respective cylinders, each said power portion further including a casing to receive compressed air from said compressor portion to feed it to said power cylinder, means for feeding compressed air from said compressor portion to said casing, means for feeding fuel to said power cylinder, and means responsive to variations of the load of said turbine for discharging some compressed air from its casing away from its power cylinder for values of said load lower than a given minimum, output conduit means extending between each said power cylinder and said intake conduit, discharge conduit means extending between each said power cylinder and the atmosphere, first valve means in each said output conduit means capable of occupying only two positions, to wit a wholly opened position and a wholly closed position, second valve means in each said discharge conduit means capable of occupying only two positions, to wit a wholly opened position and a wholly closed position, and control means for each auto-generator for operating said first and second valve means in response to the differential action of the pressure existing in each said conduit means upstream of said first and second valve means and of the pressure existing in said intake conduit, each said control means being capable of closing said first mentioned valve means while simultaneously opening said second mentioned valve means when said second mentioned pressure exceeds said first mentioned pressure by a given amount and of opening said first mentioned valve means while simultaneously closing said second mentioned valve means when said second mentioned pressure does not exceed said first mentioned pressure by said amount.

3. A power plant which comprises, in combination, a free piston auto-generator including a power portion having a power cylinder and a power piston reciprocable in said power cylinder, an air compressor portion having a compressor cylinder rigid with said power cylinder and a compressor piston reciprocable in said compressor cylinder and rigid with said power piston, said pistons being freely movable with respect to their respective cylinders, said power portion further including a casing to receive compressed air from said compressor portion to feed it to said power cylinder, means for feeding compressed air from said compressor portion to said casing, means for feeding fuel to said power cylinder, a receiver turbine having a gas intake, means responsive to variations of the load of said turbine for discharging some compressed air from said casing away from said power cylinder for values of said load lower than a given minimum, output conduit means extending between said power cylinder and the intake of said turbine, discharge conduit means extending between said power cylinder and the atmosphere, valve means in said output conduit means capable of occupying only two positions, to wit a wholly opened position and a wholly closed position, valve means in said discharge conduit means capable of occupying only two positions, to wit a wholly opened position and a wholly closed position, control means for operating said valve means and means operatively connected with said auto-generator so as to occupy either of two positions according as said auto-generator is stopped or is working, respectively, said last mentioned means being operatively connected with said control means to cause said control means to close both of said valve means when said auto-generator is stopped and to have one of said valve means opened and the other closed when said auto-generator is working.

4. A power plant which comprises, in combination, a gas turbine having a gas intake, an intake conduit leading to said gas intake, and at least two free piston autogenerators, each of said auto-generators including a power portion having a power cylinder and a power piston reciprocable in said power cylinder, an air compressor portion having a compressor cylinder rigid with said power cylinder and a compressor piston reciprocable in said compressor cylinder and rigid with said power piston, said pistons being freely movable with respect to their respective cylinders, each said power portion further including a casing to receive compressed air from said compressor portion to feed it to said power cylinder, means for feeding compressed air from said compressor portion to said casing, means for feeding fuel to said power cylinder, and means responsive to variations of the load of said turbine for discharging some compressed air from its casing away from its power cylinder for values of said load lower than a given minimum, output conduit means extending between each said power cylinder and said intake conduit, discharge conduit means extending between each said power cylinder and the atmosphere, first valve means in each said output conduit means capable of occupying only two positions, to wit a wholly opened position and a wholly closed position, second valve means in each said discharge conduit means capable of occupying only two postiions, to wit a wholly opened position and a wholly closed position, control means for each auto-generator for operating said first and second valve means in response to the differential action of the pressure existing in each said conduit means upstream of said first and second valve means and of the pressure existing in said intake conduits, each said control means being capable of closing said first mentioned valve means while simultaneously opening said second mentioned valve means when said second mentioned pressure exceeds said first mentioned pressure by a given amount and of opening said first mentioned valve means while simultaneously closing said second mentioned valve means when said second mentioned pressure does not exceed said first mentioned pressure by said amount, and means operatively connected with said auto-generator so as to occupy either of two positions according as said auto-generator is stopped or is working, respectively, said last mentioned means being operatively connected with said control means to cause said control means to close both of said valve means when said auto-generator is stopped and to have one of said valve means opened and the other closed when said auto-generator is working.

5. A power plant according to claim 3, including an exhaust conduit means for said turbine, said exhaust conduit means including a portion of said discharge conduit.

6. A power plant according to claim 4, including an exhaust conduit means for said turbine, said exhaust conduit means including a portion of said discharge conduit.

7. A power plant which comprises, in combination, a receiver machine unit including a forward drive turbine and a backward drive turbine, each of these turbines having a gas intake, an intake conduit leading to each of said turbine intakes and at least two free piston auto-generators, each of said auto-generators including a power portion having a power cylinder and a power piston reciprocable in said power cylinder, an air compressor portion having a compressor cylinder rigid with said power cylinder and a compressor piston reciprocable in said compressor cylinder and rigid with said power piston, said pistons being freely movable with respect to said cylinders, each said power portion further including a casing arranged to receive compressed air from said compressor portion and to feed it to said power cylinder, means for feeding compressed air from said compressor portion to said casing, means for feeding fuel to said power cylinder, and means responsive to variations of the load of said receiver machine unit for discharging some compressed air from said casing away from said power cylinder, two output conduit means extending each between the exhaust of one of said power cylinders and the intake conduit of one of said turbines respectively, two output valve means one in each of said output conduit means respectively, each of said output valve means being capable of occupying only two positions, to wit a wholly opened one and a wholly closed one, discharge conduit means extending between the exhaust of each said power cylinder and the atmosphere, discharge valve means in each said discharge conduit means capable of occupying only two positions, to wit a wholly opened one and a wholly closed one, manual control means for operating each said output valve means, said manual control means being capable, for one position thereof, of opening both of said output valve means and, for other positions thereof, of opening one of said output valve means while closing the other, said manual control means being adapted to be made inoperative and then to leave both of said output valve means in closed position, and automatic control means for each said auto-generator operative in response to the differential action of the pressure of the power gases at the exhaust of its power cylinder and of the sum of two pressures proportional to the respective pressures existing in said intake conduits, said automatic control means being adapted, according to the value of said differential action, either to open said associated discharge valve means while making said manual control means inoperative or to close said discharge valve means while leaving said manual control means capable of operating.

8. A power plant which comprises, in combination, a receiver machine unit including a forward drive turbine and a backward drive turbine, each of these turbines having a gas intake, an intake conduit leading to each of said turbine intakes and at least two free piston auto-generators, each of said auto-generators including a power portion having a power cylinder and a power piston reciprocable in said power cylinder, an air compressor portion having a compressor cylinder rigid with said power cylinder and a compressor piston reciprocable in said compressor cylinder and rigid with said power piston, said pistons being freely movable with respect to said cylinders, each said power portion further including a casing arranged to receive compressed air from said compressor portion and to feed it to said power cylinder, means for feeding compressed air from said compressor portion to said casing, means for feeding fuel to said power cylinder, and means responsive to variations of the load of said receiver machine unit for discharging some compressed air from said casing away from said power cylinder, two output conduit means extending each between the exhaust of one of said power cylinders and the intake conduit of one of said turbines respectively, two output valve means one in each of said output conduit means respectively, each of said output valve means being capable of occupying only two positions, to wit a wholly opened one and a wholly closed one, discharge conduit means extending between the exhaust of each said power cylinder and the atmosphere, discharge valve means in each said discharge conduit means capable of occupying only two positions, to wit a wholly opened one and a wholly closed one, manual control means for operating each said output valve means, said manual control means being capable, for one position thereof, of opening both of said output valve means and, for other positions thereof, of opening one of said output valve means while closing the other, said manual control means being adapted to be made inoperative and then to leave both of said output valve means in closed position, automatic control means for each said auto-generator operative in response to the differential action of the pressure of the power gases at the exhaust of its power cylinder and of the sum of two pressures proportional to the respective pressures existing in said intake conduits, said automatic control means being adapted, according to the value of said differential action, either to open said associated discharge valve means while making said manual control means inoperative or to close said associated discharge valve means while leaving said manual control means capable of operating, and means operatively connected with said auto-generator so as to occupy either of two positions according as said auto-generator is stopped or is working, respectively, said last mentioned means being operatively connected with said automatic control means so as to cause the three valve means to be closed when said auto-generator is stopped and to leave said automatic and manual control means free to operate when said auto-generator is working.

9. A power plant according to claim 2 further including temporary reversing means operative in response to a sudden increase of the speed of said turbine beyond a given value to reverse for a predetermined time the positions of said valve means respectively.

10. A power plant according to claim 4 further including temporary reversing means operative in response to a sudden increase of the speed of said turbine beyond a given value to reverse for a predetermined time the positions of said valve means respectively.

11. A power plant according to claim 7 further including temporary reversing means operative in response to a sudden increase of the speed of either of said turbines beyond a given value to reverse for a predetermined time the positions of said output valve means respectively.

12. A power plant according to claim 8 further including temporary reversing means operative in response to a sudden increase of the speed of either of said turbines beyond a given value to reverse for a predetermined time the positions of said output valve means respectively.

13. A power plant according to claim 3 further including temporary reversing means operative in response to a sudden increase of the speed of said turbine beyond a given value to reverse for a predetermined time the positions of said first and second valve means respectively.

References Cited in the file of this patent

UNITED STATES PATENTS

| | | |
|---|---|---|
| 2,474,697 | Schwendner | June 28, 1949 |
| 2,718,751 | Huber | Sept. 27, 1955 |
| 2,903,599 | Huber | Sept. 8, 1959 |

FOREIGN PATENTS

| | | |
|---|---|---|
| 1,109,284 | France | Sept. 21, 1955 |
| 600,509 | Great Britain | Apr. 12, 1948 |